United States Patent [19]

Silver et al.

[11] Patent Number: 5,241,627

[45] Date of Patent: Aug. 31, 1993

[54] AUTOMATIC PROCESSOR MODULE DETERMINATION FOR MULTIPROCESSOR SYSTEMS FOR DETERMINING A VALUE INDICATING THE NUMBER OF PROCESSORS

[75] Inventors: Jordan R. Silver, San Jose; Virgil S. Reichert, Sunnyvale; A. Richard Zacher, Los Gatos, all of Calif.

[73] Assignee: Tandem Computers Incorporated, Cupertino, Calif.

[21] Appl. No.: 361,785

[22] Filed: May 30, 1989

Related U.S. Application Data

[63] Continuation of Ser. No. 36,611, Apr. 9, 1987, abandoned.

[51] Int. Cl.$^5$ .............................................. G06F 15/16
[52] U.S. Cl. ................................... 395/200; 395/325; 364/229.4; 364/280.2
[58] Field of Search ... 364/200 MS File, 900 MS File; 395/200, 325

[56] References Cited

U.S. PATENT DOCUMENTS

| | | | |
|---|---|---|---|
| 3,593,300 | 7/1971 | Driscoll, Jr. et al. | 364/200 |
| 3,614,745 | 10/1971 | Podvin et al. | 364/200 |
| 3,812,468 | 5/1974 | Wollum et al. | 364/200 |
| 3,812,469 | 5/1974 | Hauck et al. | 364/200 |
| 3,866,617 | 2/1975 | Seifert, Jr. et al. | 340/152 |
| 4,228,496 | 10/1980 | Katzman et al. | 364/200 |
| 4,409,656 | 10/1983 | Andersen et al. | 364/200 |
| 4,442,502 | 4/1984 | Friend et al. | 364/900 |
| 4,491,946 | 1/1985 | Kryskow, Jr. et al. | 370/89 |
| 4,570,217 | 2/1986 | Allen et al. | 364/900 |
| 4,589,063 | 5/1986 | Shah et al. | 364/200 |
| 4,633,392 | 12/1986 | Vincent et al. | 364/200 |
| 4,638,428 | 1/1987 | Gemma et al. | 364/200 |
| 4,727,475 | 2/1988 | Kiremidjian | 364/200 |

FOREIGN PATENT DOCUMENTS 0200365 10/1986 European Pat. Off.
2179225 2/1987 United Kingdom.

OTHER PUBLICATIONS

Wescon Conference Record, vol. 24, Sep. 16–18, 1980, Paper 1/2, pp. 1–16 (Anaheim, Calif.), R. L. Evans, "Data Communications for Standalone Microcomputers".

*Primary Examiner*—Lawrence E. Anderson
*Attorney, Agent, or Firm*—Townsend and Townsend Khourie and Crew

[57] ABSTRACT

A bus controller, operable to grant access to a bus structure for communication between a number of individual processor modules interconnected by the bus to form a multiprocessor system, is also operable to determine the number of processors connected to the bus. The bus controller, in round-robin fashion, sequentially grants each processor access to the bus by commanding the processor to send data. The processor responds either by sending data in synchronism with a data clock supplied by the bus controller or, if no data is to be sent, responds with a no acknowledgment (NAK) signal. Initially, and periodically, the bus controller checks to determine the number of processors by, beginning with the highest identifying numbered processor, sending to that processor a send command, and looking for a response either in the form of data being sent or a NAK signal. If neither of these responses is received, the bus controller will transmit a send command to the next highest identifying numbered processor in order, continuing this process until a response is received. At that time, the identifying number of the processor is saved, and thereafter only that number of processors are in the bus controller's repertoire, until the next check is made.

19 Claims, 3 Drawing Sheets

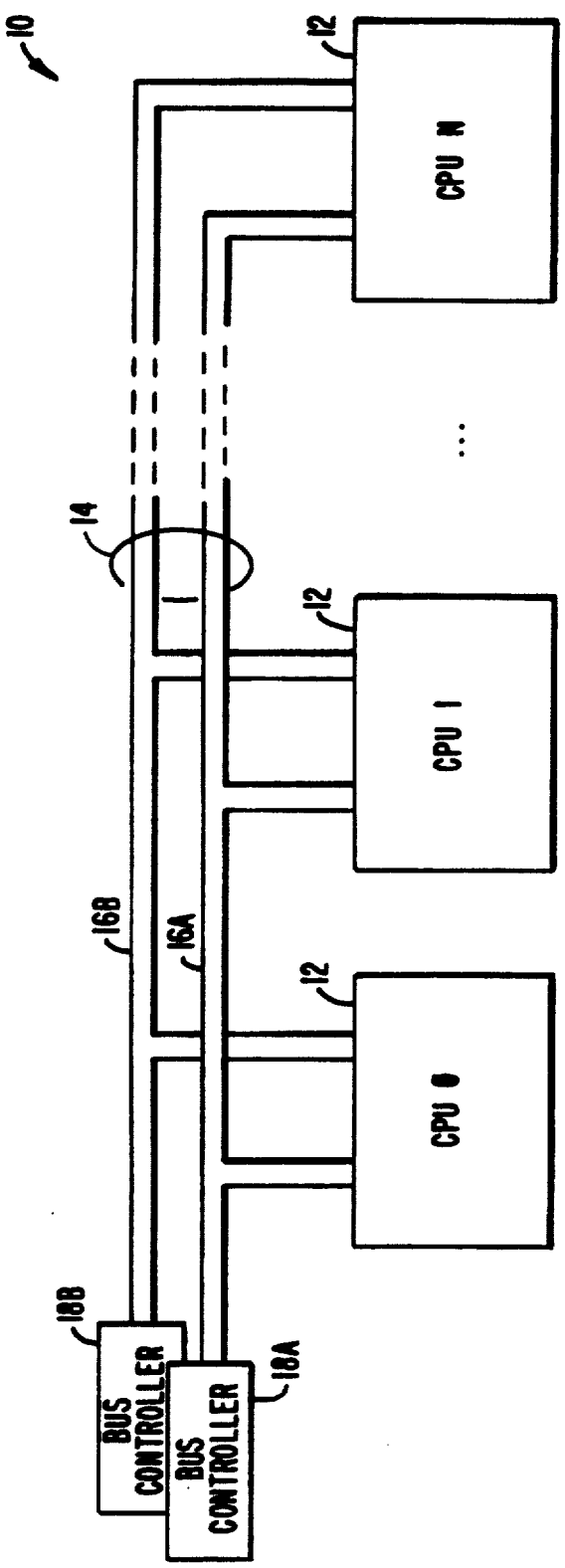
FIG._1.

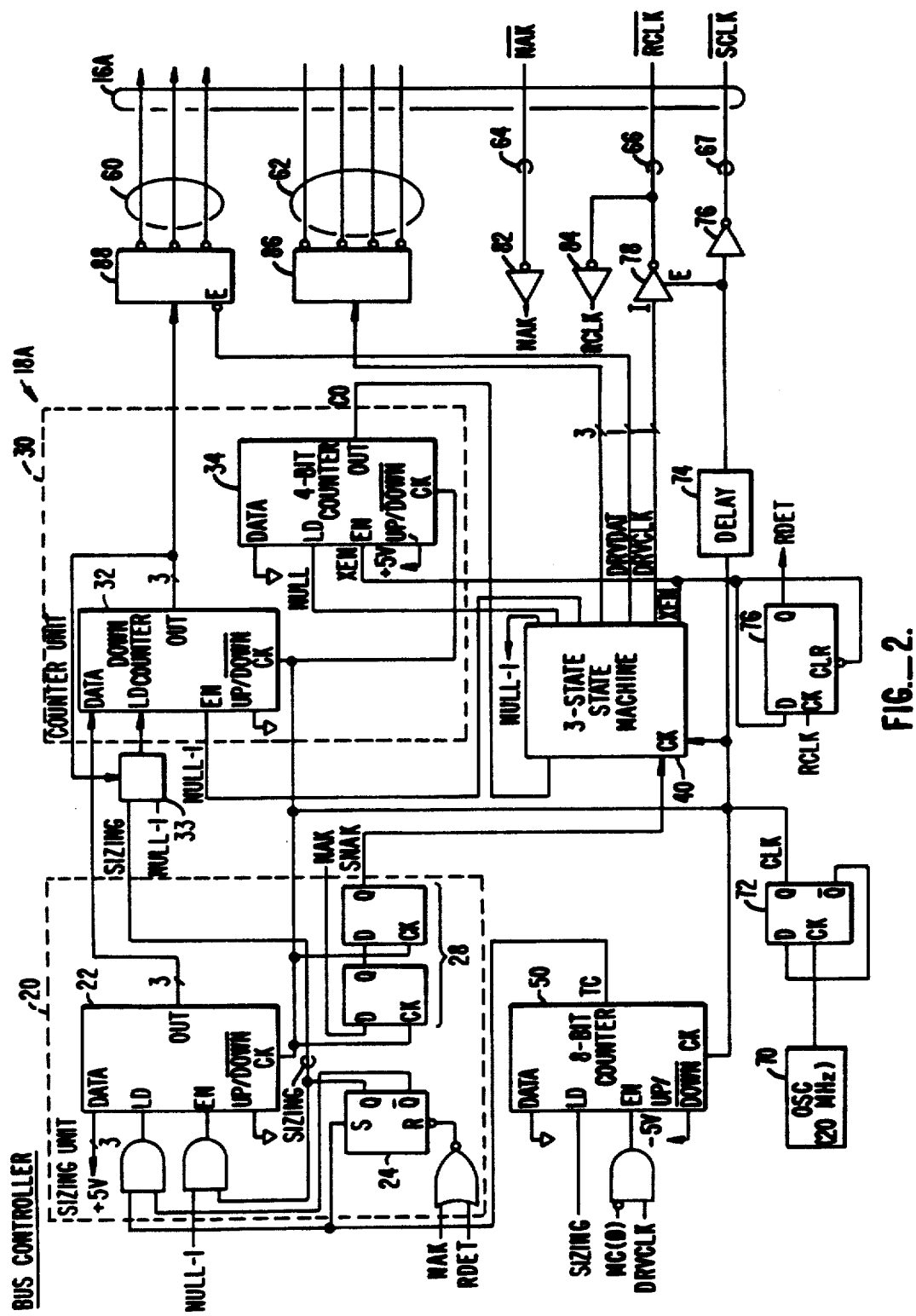
FIG._2.

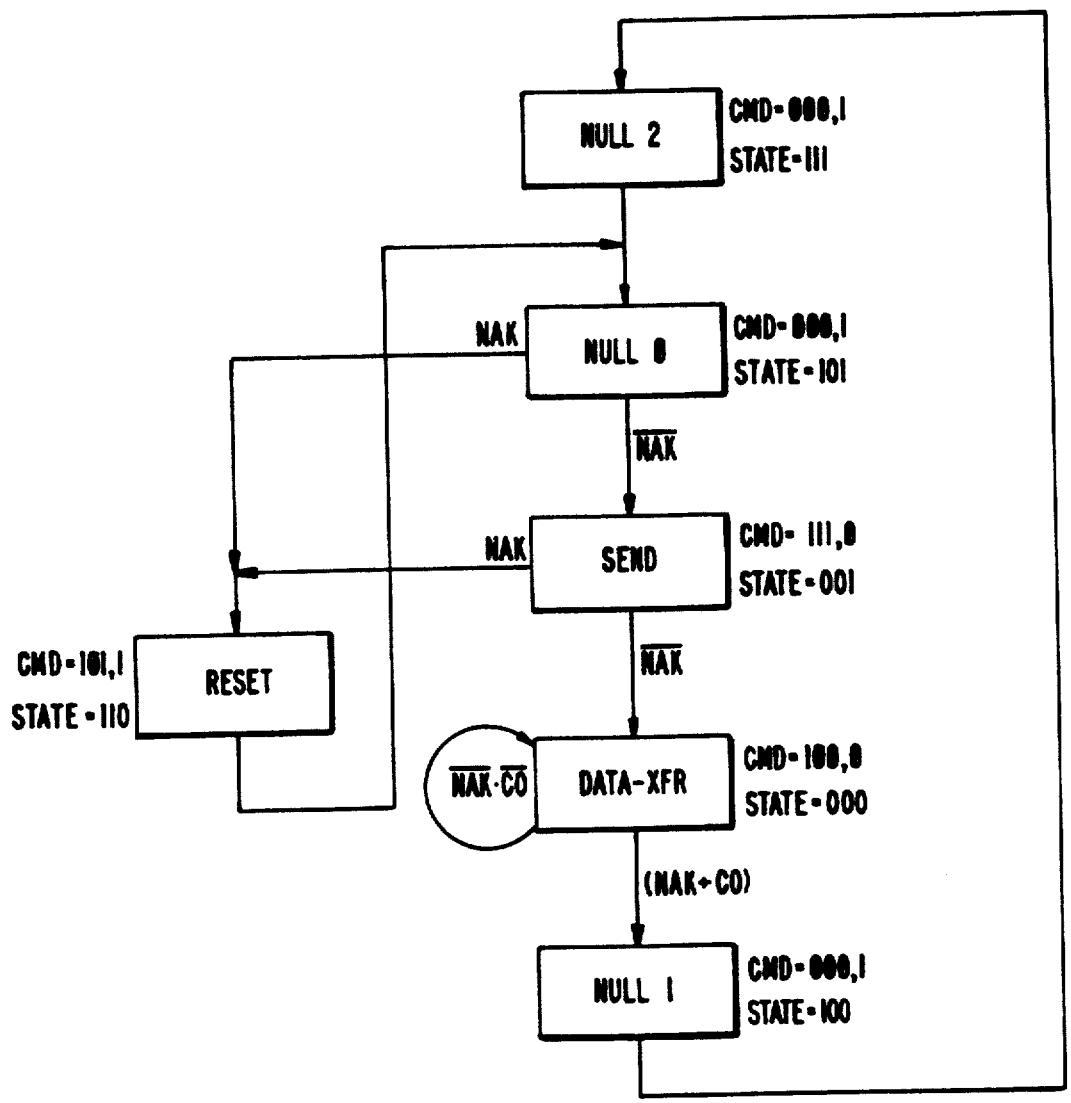
FIG._3.

AUTOMATIC PROCESSOR MODULE DETERMINATION FOR MULTIPROCESSOR SYSTEMS FOR DETERMINING A VALUE INDICATING THE NUMBER OF PROCESSORS

This is a continuation of application Ser. No. 07/036,611, filed Apr. 9, 1987, now abandoned.

BACKGROUND OF THE INVENTION

The present invention is directed to a multiprocessor system of the type including a number of individual processor modules interconnected by a bus structure that provides communication therebetween and, more particularly, to a bus controller operable to grant access to the bus for each processor module and to determine a number indicative of the processor modules operably coupled to the bus.

Today, there exist a variety of multiprocessor system architectures, each using one or another of a number of available techniques to establish data communication between the individual processors. Each have their respective advantages and disadvantages. One such multiprocessor architecture, for example, uses a central memory in "mailbox" fashion to transfer messages between processors. Another architecture incorporates a bus structure that connects the individual, autonomously operating processors for providing interprocessor communication. Communication on the bus is, at times, controlled by a bus controller which operates, in response to requests for bus access from any one of the particular controllers, to poll the processors, select (in response to the poll) a processor/receiver pair for communication, and control that communication. This communication technique has the advantage of establishing a communication colloguy in a short time, allowing high data transfers to take place between the processors of the system. An example of this type of system can be found in U.S. Pat. No. 4,228,496 to Katzman, et al.

One drawback, however, is the amount of circuitry necessary to implement the communication system. Thus, if the system can operate to conduct interprocessor communication at a lower rate, utilizing a simpler protocol, less parts are needed, resulting in a less expensive and more reliable system to construct.

SUMMARY OF THE INVENTION

The present invention is directed to a bus controller for a multiprocessor system of the type in which a number of processor modules are interconnected by a bus architecture for communication therebetween. The bus controller operates to permit bus access to each of the processors in an orderly fashion, and controls the transfer of data between processor pairs. In the multiprocessor system incorporating the invention, the processors operably connected to the bus have address identifications $0-N$, where N is preferably 7. The actual number of processors can vary from 1 to 8, and the bus controller is constructed to determine the identity of the highest numbered processor in the system.

According to the method of the present invention, the bus controller is constructed to implement the following communication protocol: Access to the bus is granted any of the processors only in response to a SEND command that issues from the bus controller in sequential, "round-robin" fashion. The bus controller applies the SEND command to the bus with an address that identifies the sending processor. If the addressed processor has data to send, that data (in the form of a 16-word data packet) is placed on the bus and synchronously transferred to a receiver processor (identified in the data packet) in response to a clock signal supplied by the bus controller. If the processor has no data to send, it responds with a no acknowledgment (NAK) signal.

The bus controller maintains a record of the highest-numbered processor address in the system, and sequentially selects processor addresses from that number down to address $0$ when granting access to the bus via the SEND command. In order to be able to select any of the up-to-eight processors that may be in the system, yet not waste time routinely selecting processors that are not present, an "autosizing" routine is used. At start-up time, and periodically during normal operation, the bus controller will transmit a SEND command with an address, using the maximum-number processor address (i.e., 7). If this addressed processor is present, it will either respond with data or, if no data is to be sent, a NAK signal. If neither response is received, the bus controller assumes (correctly) that this processor is not present, and decrements a counter that maintains the record. It then issues another SEND command, along with the next-highest processor address, and awaits a response. This process continues until one of the two valid responses are received, i.e., a data transfer or a NAK signal, from the addressed processor. At that time, the content of the counter is frozen, thereby maintaining a record of the highest-numbered processor address of the processor in the system. Thereafter, SEND commands are sent only to this, and the lower-numbered processors.

BRIEF DESCRIPTION OF THE DRAWINGS

FIG. 1 is a diagrammatic representation of a multiprocessor system incorporating the present invention;

FIG. 2 is a simplified block diagram of the bus controller of FIG. 1, illustrating implementation of the present invention; and FIG. 3 is a state diagram that illustrates operation of the bus controller of FIGS. 1 and 2.

DETAILED DESCRIPTION OF THE INVENTION

Referring first to FIG. 1, there is illustrated a multiprocessor system, designated generally with the reference numeral 10, incorporating the present invention. The multiprocessor system 10 includes processor modules 12, numbered $0-N$. The multiprocessor system 10 is preferably configured to form a fault-tolerant system. Accordingly, the preferred configuration will contain no less than two of the processors 12 forming the system, and it is presently preferred that there will be no more than eight processors. However, it will be evident to those skilled in this art that N, in fact, can take on any number; that is the number of processors 12 may be greater than 8.

Continuing reference to FIG. 1, the multiprocessor system 10 shows the processors 12 interconnected by a bus architecture 14, comprising two separate, identically constructed interprocessor buses (IPBs) 16A and 16B. A description of this bus architecture, together with a further explanation of the processors 12 and their respective interface structure to the bus architecture 14 can be found in co-pending patent application (hereinafter, the "Co-pending Application") for MULTIPROCESSOR BUS PROTOCOL, Ser. No. 845,906, filed Mar. 28, 1986, and assigned to the assignee herein, now U.S. Pat. No. 4,888,684 the disclosure of which is incorporated herein by reference.

Interprocessor communications can be conducted on either of the IPBs 16A or 16B, depending upon interprocessor traffic. In the event of possible failure of IPB 16A or IPB 16B the other can take over all traffic, thereby providing a fault tolerance to failures in interprocessor communication system. Also, as in the Co-pending Application, bus controllers 18A and 18B initiate and control all interprocessor communications, with one major difference: Whereas, the protocol used in the Co-pending Application had the bus controller initiate a polling sequence in response to processor requests for bus access, the present protocol implements a round-robin technique, sequentially granting bus access to each processor 12 with each processor 12 responding either with a data communication, or a no acknowledgment (NAK) signal. This is explained in greater detail below.

Each of the processors 12 is equipped with conventional address-sensing circuits (not shown) that allow the processor to be uniquely identified. For example, commands applied to the IPB 16A and/or 16B are accompanied by address information, identifying one of the processors 12 as the processor to receive and respond to the command. The address-sensing circuits permit each processor to determine whether the command is directed to it. Such address-sensing circuits and addressing techniques are well within the skill of those who practice in this art and, therefore, are not discussed further.

Referring now to FIG. 2, there is illustrated in block diagram form the schematic of bus controller 18A. It should be understood that the design of the bus controller 18B is identical to that of bus controller 18A. Therefore, the following description of bus controller 18A should be understood as applying equally to the design, function and operation of the bus controller 18B.

As FIG. 2 illustrates, the bus controller 18A includes four major functional units: Sizing unit 20, counter unit 30, state machine 40, and an 8-bit counter unit 50. Overall operation is controlled by the state machine 40, which uses the counter units 30 and 50 to mark various time increments in operation, as will be seen below.

The functional units are implemented using Programmable Array Logic (PAL) devices, such as that manufactured by Monolithic Memories, Inc. of Santa Clara, Calif., and sold under the part number 16R8. A description of the 16R8 PAL can be found in the *LSI Databook*, 7th Edition (1986), published by Monolithic Memories. PAL devices such as these typically include combinatorial logic and flip-flops configurable (by a user, or to user requirements) to form a variety of circuits. Here, they are used to perform primarily counting operations.

FIG. 2 is, therefore, a functional representation of the invention, implemented in the PAL devices described above.

Turning first to the sizing unit 20 in FIG. 2, shown as being included in the sizing unit 20 is a 3-bit counter 22, a set/reset flip-flop 24, and a flip-flop pair 28. The data input of the counter 22 is tied to 5 volts DC, so that coincidence at the counter's load (LD) input between a terminal count (TC) signal from counter 50 and the SIZING signal from the set/reset flip-flop 24 being not active will load or preset the counter 22 with all ONEs. The counter 22 is enabled for counting by coincidence between a NULL-1 signal from the state machine 40 and the Q output (SIZING) of the set/reset flip-flop 24. The UP/DOWN input of the counter is grounded, so that when enabled, clock pulses (applied to its clock (CK) input) will cause the counter 22 to count down from its preset value.

The set/reset flip-flop 24 is set (i.e., its Q output goes HIGH by the TC signal generated by the 8-bit counter 50, and reset when either of the no acknowledgment (NAK) or the R clock detect (RDET) signals go HIGH. The Q output of the set/reset flip-flop 24 develops a SIZING signal. When HIGH, the SIZING signal places the bus controller 18A in a mode that operates to set counter 22 to the address of the highest-numbered processor 12 in the system.

Finally, the sizing unit 20 also includes a pair of D flip-flops 28 that receive the NAK signal, and at their respective clock (CK) inputs a bus controller clock (CLK) signal. The D flip-flop pair 28 function to synchronize the (as will be seen) externally and asynchronously generated NAK signal with the bus controller clock CLK, producing a synchronized NAK (SNAK) signal.

The 3-bit output of the counter 22 is coupled to the data input of a down counter 32 contained in the counter unit 30. The content of the counter 22 will be passed through the counter 32 when the SIZING signal is HIGH (i.e., the counter 22 is placed in a transparent state when SIZING is HIGH—by being continually forced to load). When SIZING goes LOW, the then content of counter 22 is set in counter 32. In addition, the content of counter 22 is also periodically set in the counter 32 by the signal produced by combinatorial logic unit 33. Combinatorial logic unit 33 functions to communicate the SIZING signal to the LD input of the down counter 32. The combinatorial logic unit 33 also functions to provide to the LD input a HIGH when the content of the counter is ZERO and the NULL-1 signal is HIGH.

The counter 32 also receives, from the state machine 40, the NULL-1 signal at its enable (EN) input, and the bus clock (CLK) at its clock (CK) input. The counter 32 is configured, as a down counter in the same way counter 22 is: The UP/DOWN input is grounded. Thus, the content of the counter 32 will decrement 1 count each appearance of CLK when enabled, and not overriden by the load (LD) input.

The content of the down counter 32 is gated to three (of the 16 available) data lines 60 of IPB 16A via bus driver circuits 88, forming the address of a processor module 12 (FIG. 1) directed to receive a SEND command communicated on four control lines 62 of the IPB 16A. Appropriate circuits (not shown) in each of the processor modules 12 monitor the IPB 16A, determining from the data lines 60 which of them is designated to receive the commands communicated on data lines 62 of the IPB 16A.

The down counter 32 operates (Then the SIZING signal is LOW) to count down, from whatever value has been used to preset the counter 32 (i.e., the content of counter 22), to "$\emptyset$".

Also contained in the counter unit 30 is a 4-bit counter 34 that is enabled by an XEN signal from the state machine 40. Applied to the load (LD) input of the 4-bit counter 34 is a NULL signal produced by the state machine 40. When the NULL signal is LOW, the 4-bit counter is held in a continuous load state. Since the data input of the 4-bit counter 34 is grounded, the counter will load with ZEROs when NULL goes HIGH.

When the 4-bit counter 34 is enabled, and clocked by the bus controller clock CLK, it will count until it produces a carry-out (CO) signal that indicates the counter has been clocked through its full 16 states. More about counter 34 later.

Turning now to 8-bit counter 50, this counter is configured to be disabled by the SIZING signal which is received by the counter at its load (LD) input. Since the data input of the counter input is grounded, the counter will be held in a ZERO state while SIZING is HIGH. When SIZING goes LOW, the counter 50 has been preset with ZERO. When the SIZING signal is LOW, however, the 8-bit counter 50 is enabled for clocking (by CLK) by coincidence between a DRVCLK signal from the state machine 40 and an MC(∅), which is developed from the least significant bit of the output of the down counter 32. The 8-bit counter counts from ∅ to 128. At count 128, the most significant bit (MSB) of the 8-bit counter, which is the terminal count (TC) signal, goes HIGH. As shown in FIG. 2, the TC signal is applied to the set (S) input of the set/reset flip-flop 24, bringing the SIZING signal HIGH. At the same time the TC signal is coupled to the counter 22 where it operates with $\overline{SIZING}$ to preset the counter with three "1s".

The heart of the bus controller 18A is state machine 40. State machine 40 is a conventional three-stage state machine receiving as inputs the synchronized NAK signal, SNAK, produced by the D flip-flop pair 28, the carry-out (CO) signal of the 4-bit counter 34 of counter unit 30, and the periodic CLK signal. The state machine 40 operates to cyclically sequence through the five states illustrated in FIG. 3 as NULL2, NULL ∅, SEND, DATA-XFR, and NULL1, with periodic excursions to a RESET state, as will be described. As the state machine 40 proceeds through the states illustrated in FIG. 3, various control signals are generated to direct operation of the bus controller 18A, and to signal the individual processors 12 via the interprocessor bus 16A. For example, the state machine 40 produces a 4-bit command signal (CMD), consisting of three bits of command information and a parity bit (for odd parity). Also produced is a NULL-1 signal that is used in the bus controller 18A to enable the down counter 32 of counter unit 30, and to enable (7ith SIZING) the counter 22. A NULL signal provided by the state machine 40 operates, 7hen HIGH (It is low only during the DATA-XFR and SEND states— FIG. 3.) to hold the 4-bit counter is a perpetual load state, while the state machine produced XEN signal enables the 4-bit counter 50 for counting.

Additionally, the state machine 40 produces a drive clock (DRVCLK) and a drive data (DRVDAT) signals. The DRVCLK signal operates as an enable signal to produce a receive clock ($\overline{RCLK}$) that is applied to a clock line 66 of the interprocessor bus 16A. The DRVDAT signal is applied to the enable (E) input of the driver unit 88 to gate the outputs of down counter 32 to data lines 60.

The state machine 40 receives, at its clock (CK) input the CLK signal of the bus controller 18A to maintain synchronous operation through its various states. The CLK signal originates at a 20 MHz oscillator 70, whose output is applied to the clock (CK) flip-flop 72 connected in a divide-by-two configuration. The Q output of the flip-flop 72 forms the CLK signal that is used variously throughout the bus controller 18A for synchronous operation of its circuits.

All clocking for data transfer on the IPB 16A is supplied by the bus controller 18A. As explained in the above-identified Co-pending Application, a send clock ($\overline{SCLK}$) is produced by the bus controller 18A, which is used by the processor 12 sending data to develope a receive clock ($\overline{RCLK}$) that, in turn, is used by the processor 12 receiving data to clock data from the interprocessor bus 16A. The send clock ($\overline{SCLK}$) is developed from the bus controller clock (CLK) via a delay circuit 74, which provides a delay to ensure that clocking occurs when valid data is on the interprocessor bus 16A. A driver amplifier 76 communicates the delayed CLK signal to a signal line of the IPB 16A as $\overline{SCLK}$.

The delayed CLK signal from the delay circuit 74 is also applied to an enable (E) input of a buffer amplifier 78. The data input (I) of the buffer amplifier 78 receives the drive clock (DRVCLK) signal from the state machine 40 to develop a receive clock ($\overline{RCLK}$) that is used by the processors 12 to clock in data sent by the bus controller 18A (i.e., processor address on data lines 60).

Referring now to FIG. 3, wherein is illustrated a state diagram of the state machine 40 (FIG. 2), there is shown the six valid states the state machine 40 can assume. The command (CMD) signals issued by the state machine 40 in each state is shown, in FIG. 3, to the right of each illustrated state. The comma shown in the CMD bits separates the three command bits from the parity bit.

General operation of the bus controller 18A is as follows: Assume first that the content of the counter 22 of sizing unit 20 has been used to preset the down counter 32 of the counter unit 30 with some number identifying the highest-numbered address of processors 12 in the system 10 (FIG. 1). Assume further that the state machine 40 is in the NULL1 state, issuing the command ∅∅∅, 1, which is passed to the four control lines 62 of the interprocessor bus 16A, via driver amplifiers 86, indicating no bus activity. The next sequential pulses of the CLK signal will each cause the state machine 40 to assume the next states in sequence: The NULL2 state, which also issues the ∅∅∅, 1 command, the NULL∅ state, and the SEND state. However, the transition from the NULL∅ state to the SEND state will occur only if the NAK signal from the processors 12 (produced from NAK via bus line 64 and receiver 82) is not active, i.e., LOW. The situation of NAK active (i.e., HIGH) during these states will be discussed later.

In the SEND state, the DRVDAT signal from the state machine 40 goes LOW to enable the driver amplifier unit 88, communicating the output of the down counter 32 to the three data lines 60 of the interprocessor bus 16A, and thereby identifying one of the processors 12 (FIG. 1) for receipt of the CMD signals on command lines 62 of IPB 16A. At the same time, the command CMD signal changes from ∅∅∅, 1 to 111, ∅, indicating that the processor 12 identified by the information on data lines 60 is to send data, if it has any to send. If the identified processor 12 has data to send, this command and identification information will cause the processor send state machine (not shown) to "awaken." The identification and command information are respectively clocked into the recipient processor 12 by the $\overline{RCLK}$ and the SCLK clock signals developed by the bus controller 18A. This is the only time the bus controller 18A develops the $\overline{RCLK}$ clock signal; all other times the $\overline{RCLK}$ is developed by the processor 12 that is sending data, if there is any data sent. In this instance, however, the $\overline{RCLK}$ signal is developed by the drive clock (DRVCLK) signal from the state machine 40 going HIGH and the delayed CLK signal.

The next CLK pulse will move the state machine 40 to the DATA-XFR state (again, if NAK is still LOW). Now, DRVCLK goes LOW, disabling the driver amplifier 78 and terminating the production of $\overline{\text{RCLK}}$ by the bus controller 18A. Also, the XEN signal produced by the state machine 40 goes HIGH to enable the D flip-flop 76 (for purposes not germane to the present discussion, but will be discussed below) and the 4-bit counter 34 of counter unit 30. At the same time, the NULL signal also goes LOW, having preset the 4-bit counter 34 with ZERO. The state machine 40 will remain in the DATA-XFR state as long as the NAK and CO signals from the receiver 82 and 4-bit counter 34, respectively, are LOW. Thus, if the identified processor 12 has data to send, it will clock that data onto the interprocessor bus 16A in response to the $\overline{\text{SCLK}}$ signal on line 67 of the IPB 16A. The identified (sending) processor 12 also develops, from the $\overline{\text{SCLK}}$, the $\overline{\text{RCLK}}$ clock signal that will be used by the receiver processor 12 to clock the transmitted data from the interprocessor bus 16A. This is further described in the Co-pending Application.

As indicated above, data is sent via the interprocessor bus 16A by the processors 12 in data packets of 16 words each. Thus, each communicated data packet requires 16 $\overline{\text{SCLK}}$ pulses for transmission. These pulses are counted by the 4-bit counter 34, and when 16 data words have been sent, the CO signal from the 4-bit counter 34 goes HIGH. The CO signal, when HIGH, combines with the immediately succeeding CLK pulse to cause the state machine 40 to move from the DATA-XFR to the NULL1 state.

If, while the state machine 40 was in the previously described DATA-XFR state, the identified processor 12 did not have data to send, it (the processor) would respond with a $\overline{\text{NAK}}$ signal on line 64 of the interprocessor bus 16A, producing the NAK signal (and, ultimately, the synchronized SNAK signal) in the bus controller 18A. With NAK (and SNAK) HIGH, the state machine 40 will also change from the DATA-XFR state to the NULL1 state.

The transition from the DATA-XFR state to the NULL1 state causes the CMD signals to go from a 101, 1 to 000,1. This transition also brings the NULL signal HIGH, in effect clearing the 4-bit counter 34 (and holding it in this clear state until the next DATA-XFR time). It also brings the NULL-1 signal HIGH to enable the down counter 32. Appearance of the next CLK pulse will decrement the content of the counter. The next sequential processor 12 identification is thereby established, and the state machine 40 again cycles through the NULL-1 -DATA-XFR states, as described above. If, however, the content of the down counter 32 has reached its smallest-numbered processor, i.e., 000, the combinatorial logic unit 33 will apply a HIGH to the LD input of the counter when NULL-1 is HIGH, presetting the down counter 32 with the content of the highest-number processor from the counter 22.

As described above, the least significant bit of the output of the down counter 32 is used, during the time DRVCLK is HIGH (i.e., during the SEND state—FIG. 3) to enable the 8-bit counter 50. Thus every other interprocessor transfer, or attempted data transfer, is counted. After 256 data transfers and/or attempted data transfers, when the count in the 8-bit counter 50 has reached 128, the TC signal goes HIGH, momentarily (with the $\overline{\text{O}}$ output from the set/reset flip-flop 24) applying a HIGH to the LD input of the counter 22, presetting it with "1s". The SIZING signal goes HIGH as described above, completing the preset of counter 22, and placing the bus controller in the "autosizing" mode in which an indication of a highest-numbered processor address in the system is determined and latched in the counter 22 of sizing unit 20. SIZING also operates (when HIGH) to disable both the down counter 32 (placing it in a transparent state) and the 8-bit counter 50. SIZING, together with the NULL-1 signal (produced by the state machine 40 during the NULL1 state), enables the counter 22, for clocking by the CLK signal, allowing it to count down each NULL1 state. Digressing for a moment, an alternate embodiment of the invention would be to preset the counter 22 with a value derived, in part, from its before-preset content, using a tier system. For example, combinatorial logic (not shown) could be structured to receive various of the bus controller signals, including the output of the counter 22, to develop a value that is applied to the data inputs of the counter 22. That value could be derived as follows:

A. If, prior to SIZING, there were three or less processors 12 operably forming the multiprocessor system 10 (i.e., the content of the counter 22 were three or less), the preset logic 26 presets the counter 22 with a 4.

B. If, on the other hand, the content of the counter 22 indicated four or more processors 12 formed the multiprocessor system 10 prior to SIZING, the preset logic 26 develops a "7" that is used to preset the counter 22.

With SIZING high, as mentioned above, the down counter 32 is transparent, so that it is the content of the counter 22 that is applied to the data lines 60 as the processor address or identification. The state machine 40 continues to cycle through its states of FIG. 3. If the processor 12 identified by the information on the data lines 60 is non-existent, no $\overline{\text{RCLK}}$ or NAK signals will be developed. The state machine 40 will remain in the DATA-XFR state until 16 $\overline{\text{SCLK}}$ clocks have been transmitted and the CO signal goes HIGH to move it from the DATA-XFR state to the NULL1 state, at which time NULL-1 goes HIGH. The NULL-1 signal, with SIZING, enables the counter 22 so that the next CLK pulse causes the counter to decrement by 1 to identify the next largest processor address in sequence.

The state machine 40 again cycles through the states shown in FIG. 3, as described above. If this next processor 12 identified by the content of the counter 22 again does not exist, the counter 22 will again be decremented during the NULL1 state and the procedure continues.

Ultimately, the content of the down counter 22 will identify the processor address of the highest-numbered processor 12 operably coupled to the interprocessor bus 16A. When this occurs, the identified processor 12 will, during the DATA-XFR state, respond either with a data transmission or a NAK signal, indicating no data to send. If the former, the identified processor 12 will return the $\overline{\text{SCLK}}$ clock generated by the bus controller 18A as $\overline{\text{RCLK}}$ for use by the receiver processor. The processor-generated $\overline{\text{RCLK}}$ clock is also received by the bus controller 18A at the line receiver 84, whose output provides the RCLK signal that is applied to the clock CK input of the D flip-flop 76. Since, during the DATA-XFR state, the transfer enable (XEN) signal is high to enable the 4-bit counter 34 to count the clock pulses used to transmit data on the interprocessor bus 16A, it also enables the D flip-flop 76 so that when the first RCLK signal is received, indicating initiation of a data transfer on the interprocessor bus 16A, the D flip-flop 76 generates (i.e., brings HIGH) the R-clock detect (RDET) signal.

The RDET signal is coupled (alternately with the SNAK signal) to the reset (R) input of the set/reset flip-flop 24. The set/reset flip-flop 24 is reset, terminating the SIZING signal, freezing the then content of the counter 22, and enabling the 8-bit counter 50 and the down counter 32 for normal operation. The data transmission is complete and the bus controller 18A continues its operation as described above until the next autosizing routine.

In the event the highest-numbered processor 12 is identified during the autosizing routine, but it has no data to transmit, the processor 12 will respond with a $\overline{NAK}$ signal on bus line 64, which is received by the receiver 82 of the bus controller 18A. The receiver 82 forms the NAK signal that is alternately coupled to the reset (R) input of the set/reset flip-flop 24 to reset that flip-flop and remove the bus controller from the autosizing mode as did the RDET signal.

At times, the processors 12 (or more accurately, the bus send machines—not shown—of any processor 12) may get out of synchronization with the bus controller 18A. This lack of synchronization causes the processors 12 to send a $\overline{NAK}$ at the wrong times, i.e., at times other than when the state machine 40 is in its DATA-XFR state. It is only during the DATA-XFR state that transmitted $\overline{NAK}$ signals are recognized as being valid.

Thus, if a $\overline{NAK}$ signal is recognized as being active during the NULL0 or SEND states, the next sequential CLK pulse received during any one of these states will move the state machine 40 to the RESET state (FIG. 3); a "101" command is issued that, when communicated to the processors 12 via the bus lines 62, unconditionally forces all processors 12 to the same "wait" state, synchronizing them with the bus controller 18A.

While a full and complete disclosure of the preferred embodiment of the invention has been made, it will be evident to those skilled in this art that modifications can be made without departing from the scope of the invention. For example, with the addition of a bit more circuitry, the bus controller 18A can be configured to determine the address of each processor 12 operably in the system.

We claim:

1. A method for determining a value indicative of the number of individual processor modules cooperatively coupled to a bus means for interprocessor communication in a multiprocessor system, each of the processor modules being individually identifiable by a unique, predefined address signal for receipt of command signals communicated on the bus means, the method comprising the steps of:
   initially, setting the value to a predetermined quantity;
   issuing, in an ordinal sequence, address signals to sequentially identify each of the processor modules;
   accompanying each of the address signals with a command signal requiring a response from the processor module identified by such address signals;
   monitoring the bus means for the response from each addressed module; and
   incrementing the value to indicate each received response from each addressed processor module.

2. The method of claim 1, wherein the ordinal sequence is descending.

3. The method of claim 1, wherein the ordinal sequence is ascending.

4. The method of claim 1, wherein the response is a data transmission on the bus means by the processor module identified by the address signals.

5. The method of claim 4, wherein the response is alternatively a NAK signal to indicate no data transmission.

6. In a multiprocessor system of the type configurable to include a number of processor modules interconnected by bus means for interprocessor communication, there being a plurality of processor modules less than or equal to the number coupled to the bus means, each of the plurality of processor modules being responsive to a corresponding one of a number of address signals uniquely identifying such processor module and a send command signal, accompanying the address signal, to communicate data or a NAK signal on the bus means, an apparatus for determining the number of processor modules connected to the bus means, comprising:
   first circuit means for generating the number of address signals to sequentially identify each of the plurality processor modules in a predetermined order;
   control means for generating the send command;
   second circuit means for monitoring the bus means for communication of data or the NAK signal from the address signal-identified processor module to produce therefrom a response signal signifying communication of data or the NAK signal from the address signal-identified processor module; and
   third circuit means, responsive to the response signal, for generating a value indicative of the number of processor modules connected to the bus means.

7. In a multiprocessor system configurable to include a prescribed plurality of address-identifiable processor modules interconnected by a bus means for interprocessor communication, there being a number of processor modules less than or equal to the prescribed plurality of processor modules operably coupled to the bus, each of the number of processor modules being operable in response to address signals uniquely identifying such processor module and command signals to communicate a response on the bus means, an apparatus for determining a value indicative of the number of processor modules operatively coupled to the bus, comprising:
   first counter means for generating address signals in an ordered sequence to sequentially identify at least each of the number of processor modules;
   control means for generating the command signals;
   circuit means coupling the address signals and the command signals to the bus means; and
   monitoring means, coupled to the bus means, for detecting a processor module response to the command signals; and means, coupled to the monitoring means, for causing the first counter means to generate the address signals to be generated in the ordered manner, and for halting the operation of the first counter means when the first processor module response is detected;
   so that the first counter means, when halted, contains a count indicative of the value.

8. The apparatus of claim 7, including second counter means periodically presettable with the value from the first counter means; the second counter means being operable to generate address signals sequentially identifying each of the second prescribed plurality of processor modules.

9. The apparatus of claim 8, including third counter means operable to count each of the cycles of the second counter means to produce a terminal count after a predetermined number of said cycles; and means operable in response to the terminal count to preset the first counter means with a predetermined count.

10. The apparatus of claim 9, wherein the first counter means is a down counter.

11. The apparatus of claim 9, wherein the apparatus is operable in a first mode to couple address signals generated by the first counter means to the bus means, and in a second mode operable to couple the address signals generated by the second counter means to the bus means.

12. The apparatus of claim 11, wherein the first counter means is coupled to the bus means by the second counter means, the second counter means being held in a transparent mode to communicate the first counter means to the bus means when the apparatus is in the first mode.

13. In a multiprocessor system of the type configurable to include a number of processor modules interconnected by bus means for interprocessor communication, there being operably coupled to the bus means a plurality of processor modules less than or equal to the number, each of the plurality of processor modules being responsive to a corresponding one of a number of address signal uniquely identifying such processor module and an accompanying send command signal to communicate data or a NAK signal on the bus means, apparatus for determining a value indicative of the number of processor modules connected to the bus means, comprising:

first counter means for generating the number of address signals in a predetermined sequence to identify each of the processor modules;

first circuit means for generating the send command signal;

second circuit means for communicating the address signals and the send command to the bus means;

third circuit means for monitoring the bus means for communication of data or the NAK signal from the address signal-identified processor and to cause the first counter means to a content indicative of the highest address of the plurality of the processor modules connected to the bus means.

14. The multiprocessor system of claim 13, the apparatus including second counter means operable in a first transparent mode to communicate the address signals from the first counter means to the bus means.

15. The multiprocessor of claim 14, wherein the second counter means is operable in a second mode to terminate communication of the address signals from the first counter means to the bus means, and to generate the address signals in a predetermined sequence.

16. The multiprocessor system of claim 15, including means operable to periodically preset the second counter means with the content of the first counter means.

17. In a multiprocessor system configurable to include a first prescribed plurality of address-identifiable processor modules interconnected by a bus means for interprocessor communication, there being a second prescribed plurality of processor modules less than or equal to the first prescribed plurality of processor modules operably coupled to the bus, each of the second prescribed plurality of processor modules being operable in response to address signals identifying such processor module and command signals to communicate a response on the bus means, an apparatus for determining a value indicative of the second prescribed plurality of processor modules operatively coupled to the bus, comprising:

first counter means for generating first address signals sequentially identifying in a descending order each of the number of processor modules;

second counter means periodically presettable with the address signals from the first counter means, the second counter means being operable to generate second address signals sequentially identifying each of the second prescribed plurality of processor modules;

third counter means operable to count each of the cycles of the second counter means to produce a terminal count after a predetermined number of said cycles;

circuit means operable in response to the terminal count to preset the first counter means with a predetermined count;

control means for generating the command signals;

first circuit means coupling the address signals and the command signals to the bus means; and monitoring means, coupled to the bus means, for detecting a first processor module response to the command signals; and second circuit means, coupled to the monitoring means, for halting the operation of the first counter means when the first processor module response is detected so that the first counter means, when halted, contains the value;

whereby, the apparatus is operable in a first mode to couple address signals generated by the first counter means to the bus means, and in a second mode operable to couple the address signals generated by the second counter means to the bus means.

18. The apparatus of claim 17, wherein the first counter means is coupled to the bus means by the second counter means, the second counter means being held in a transparent mode to communicate the first counter means to the bus means when the apparatus is in the first mode.

19. The apparatus of claim 17, wherein the first counter means is a down counter.

* * * * *